US012362493B2

(12) United States Patent
Senoo et al.

(10) Patent No.: US 12,362,493 B2
(45) Date of Patent: Jul. 15, 2025

(54) ANTENNA ELEMENT AND ANTENNA DEVICE

(71) Applicant: JAPAN AVIATION ELECTRONICS INDUSTRY, LIMITED, Tokyo (JP)

(72) Inventors: Takuma Senoo, Tokyo (JP); Hiroshi Toyao, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 161 days.

(21) Appl. No.: 18/241,247

(22) Filed: Sep. 1, 2023

(65) Prior Publication Data

US 2024/0128648 A1 Apr. 18, 2024

(30) Foreign Application Priority Data

Oct. 12, 2022 (JP) ................................ 2022-164174
Oct. 12, 2022 (JP) ................................ 2022-164177

(51) Int. Cl.
*H01Q 13/02* (2006.01)
*H01Q 1/38* (2006.01)
*H01Q 9/04* (2006.01)

(52) U.S. Cl.
CPC ............... *H01Q 13/02* (2013.01); *H01Q 1/38* (2013.01); *H01Q 9/045* (2013.01)

(58) Field of Classification Search
CPC ........ H01Q 1/38; H01Q 9/045; H01Q 9/0435; H01Q 9/0407
See application file for complete search history.

(56) References Cited

U.S. PATENT DOCUMENTS

| | | | |
|---|---|---|---|
| 7,046,203 | B2 | 5/2006 | Yuanzhu |
| 7,649,498 | B2 | 1/2010 | Noro et al. |
| 2009/0128442 | A1 | 5/2009 | Fujita et al. |
| 2022/0200151 | A1 | 6/2022 | Wang et al. |

FOREIGN PATENT DOCUMENTS

| | | | |
|---|---|---|---|
| CN | 108511913 | B | 9/2022 |
| EP | 2081256 | A1 | 7/2009 |
| JP | 2005143027 | A | 6/2005 |
| JP | 2008079009 | A | 4/2008 |
| JP | 2008079011 | A | 4/2008 |
| JP | 2008193204 | A | 8/2008 |
| JP | 2009021884 | A | 1/2009 |

OTHER PUBLICATIONS

Extended European Search Report (EESR) dated Feb. 12, 2024, issued in counterpart European Application No. 23194361.4.

*Primary Examiner* — Dieu Hien T Duong
(74) *Attorney, Agent, or Firm* — Holtz, Holtz & Volek PC

(57) ABSTRACT

An antenna element comprises an upper conductor, first lower conductors, second lower conductors, first leg portions, second leg portions and feeding portions. The upper conductor has a middle portion, a ring portion and coupling portions. The ring portion continuously surrounds the middle portion, and the coupling portions couple the middle portion and the ring portion to each other. The first leg portions extend from the middle portion, and the second leg portions extend from the ring portion. The first lower conductors and the second lower conductors are distinct and separated from one another and are apart from the upper conductor in an up-down direction. The first lower conductors are connected to the first leg portions, and the second lower conductors are connected to the second leg portions. The feeding portions extend from the upper conductor.

7 Claims, 15 Drawing Sheets

ANTENNA ELEMENT AND ANTENNA DEVICE

CROSS REFERENCE TO RELATED APPLICATIONS

This application is based on and claims priority under 35 U.S.C. § 119 to Japanese Patent Applications No. JP2022-164174 filed Oct. 12, 2022 and No. JP2022-164177 filed Oct. 12, 2022, the contents of which are incorporated herein in their entirety by reference.

BACKGROUND OF THE INVENTION

This invention relates to an antenna element and an antenna device provided with the antenna element.

JP 2008-193204 A (Patent Document 1) discloses an antenna device provided with an antenna element formed of a sheet metal. It is said that the antenna device of Patent Document 1 can be downsized in comparison with a flat surface type antenna device provided with a ceramic substrate.

Referring to FIG. 25, an antenna device 90 disclosed in Patent Document 1 is provided with a dielectric substrate 92, an antenna element 95 which is formed of a sheet metal and arranged at a predetermined interval from the dielectric substrate 92, a plurality of leg pieces 952 extending from the antenna element 95 toward the dielectric substrate 92, a chip capacitor 94 electrically connected to the leg pieces 952 and the dielectric substrate 92, and an insertion member 96 which is made of resin and inserted between the dielectric substrate 92 and the antenna element 95.

SUMMARY OF THE INVENTION

In recent years, there is a need for an antenna device which is not only small but also capable of dual-band communication.

It is, therefore, an object of the present invention to provide an antenna device which is small and capable of dual-band communication and to provide an antenna element used in the antenna device.

One aspect of the present invention provides an antenna element for forming an antenna device by being mounted on a ground conductor via a dielectric body. The antenna element comprises an upper conductor, at least one first lower conductor, at least one second lower conductor, at least one first leg portion, at least one second leg portion and at least one feeding portion. The upper conductor has a middle portion, a ring portion and a coupling portion. The ring portion is located apart from the middle portion and continuously surrounds the middle portion. The coupling portion couples the middle portion and the ring portion to each other. The at least one first leg portion extends from the middle portion. The at least one second leg portion extends from the ring portion. The at least one first lower conductor is apart from the upper conductor in an up-down direction and connected to the at least one first leg portion. The at least one second lower conductor is distinct and separated from the at least one first lower conductor and is apart from the at least one first lower conductor. The at least one second lower conductor is apart from the upper conductor in the up-down direction and connected to the at least one second leg portion. The at least one feeding portion extends from the upper conductor.

Another aspect of the present invention provides an antenna device comprising the aforementioned antenna element, a ground conductor and a dielectric body lying between the antenna element and the ground conductor.

In the antenna element of the aforementioned aspect, each of the first lower conductor and the second lower conductor forms a capacitor together with the upper conductor. With this structure, the antenna element can be downsized. The antenna device provided with the antenna element can also be downsized.

In particular, a shape of the second lower conductor and a size of the second lower conductor influence setting of two frequencies of first and second resonances, and a shape of the first lower conductor and a size of the first lower conductor only influence setting of the frequency of the first resonance. Accordingly, by deciding the shape and the size of each of the first lower conductor and the second lower conductor, the first resonance and the second resonance can be set to desired frequencies. Thus, the antenna element for the antenna device which is capable of dual-band communication can be obtained.

An appreciation of the objectives of the present invention and a more complete understanding of its structure may be had by studying the following description of the preferred embodiment and by referring to the accompanying drawings.

Figure 1:
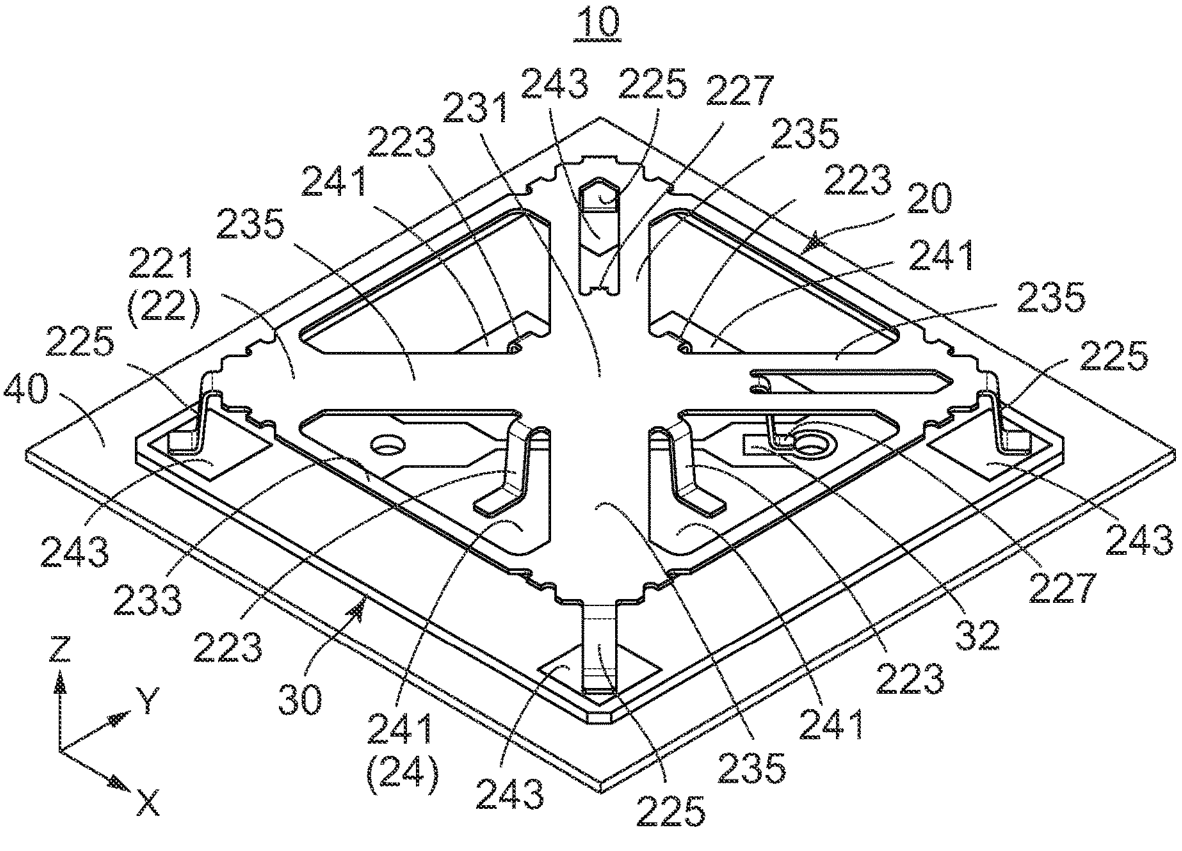
FIG. 1 is a perspective view showing an antenna device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 2:
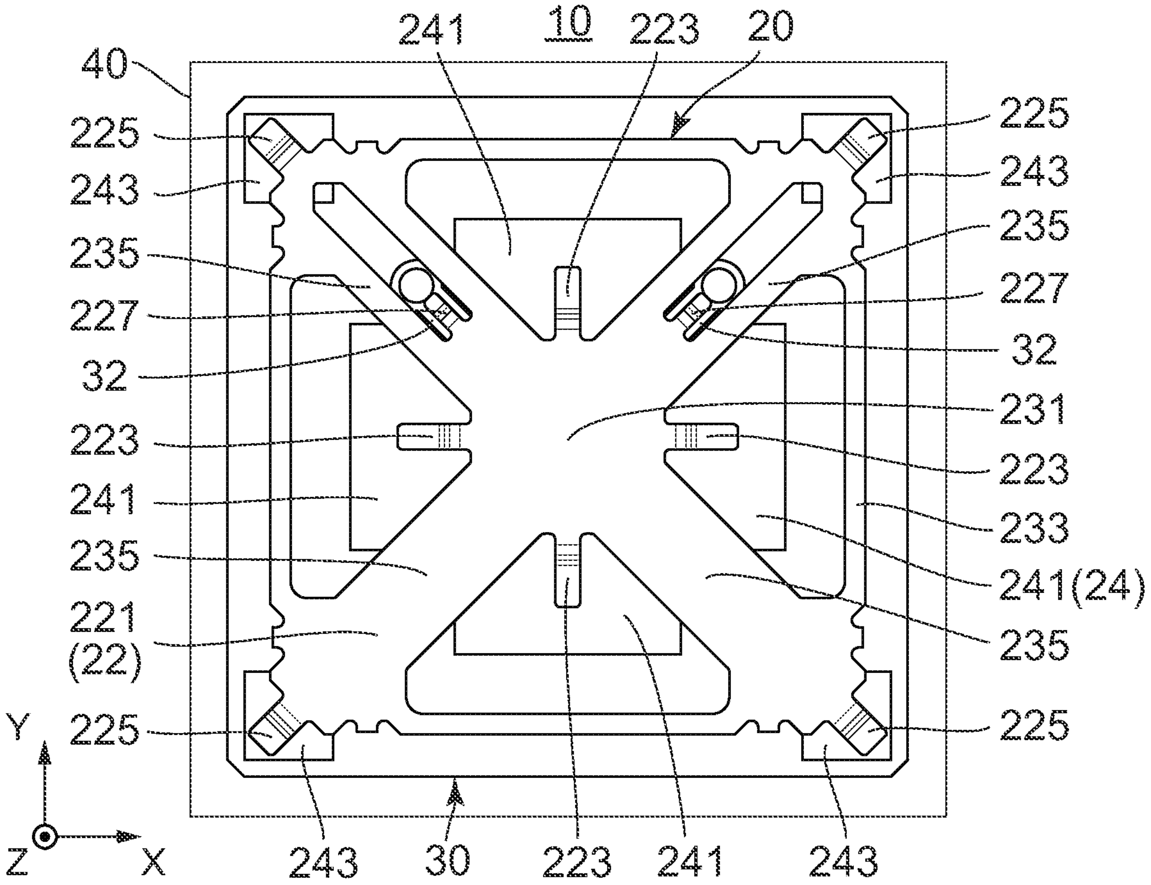
FIG. 2 is a top view showing the antenna device of FIG. 1.
Figure 3:
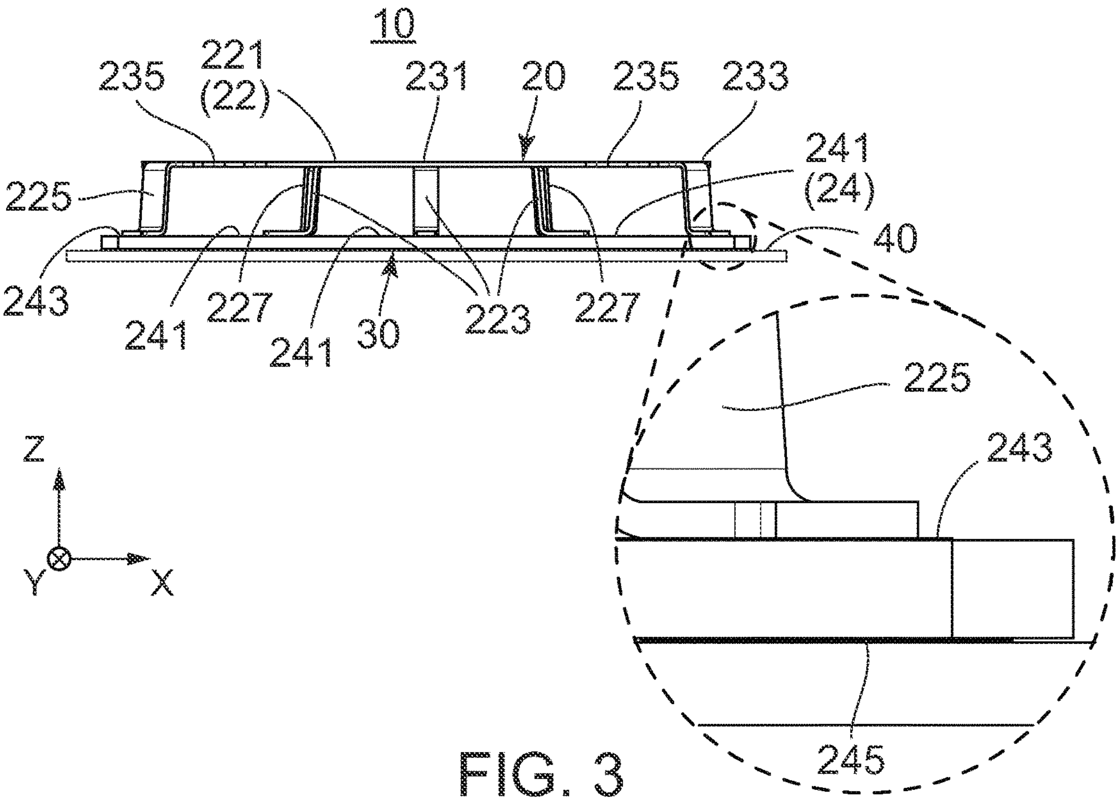
FIG. 3 is a side view showing the antenna device of FIG. 1. Part of a second leg portion and a vicinity thereof are shown in an enlarged fashion.

Referring to FIGS. 1 to 3, an antenna device 10 according to a first embodiment of the present invention is provided with an antenna element 20, a dielectric substrate 30 and a ground conductor 40. In other words, the antenna element 20 is provided on the ground conductor 40 via the dielectric substrate (or a dielectric body) 30 and thereby forms the antenna device 10.

Figure 4:
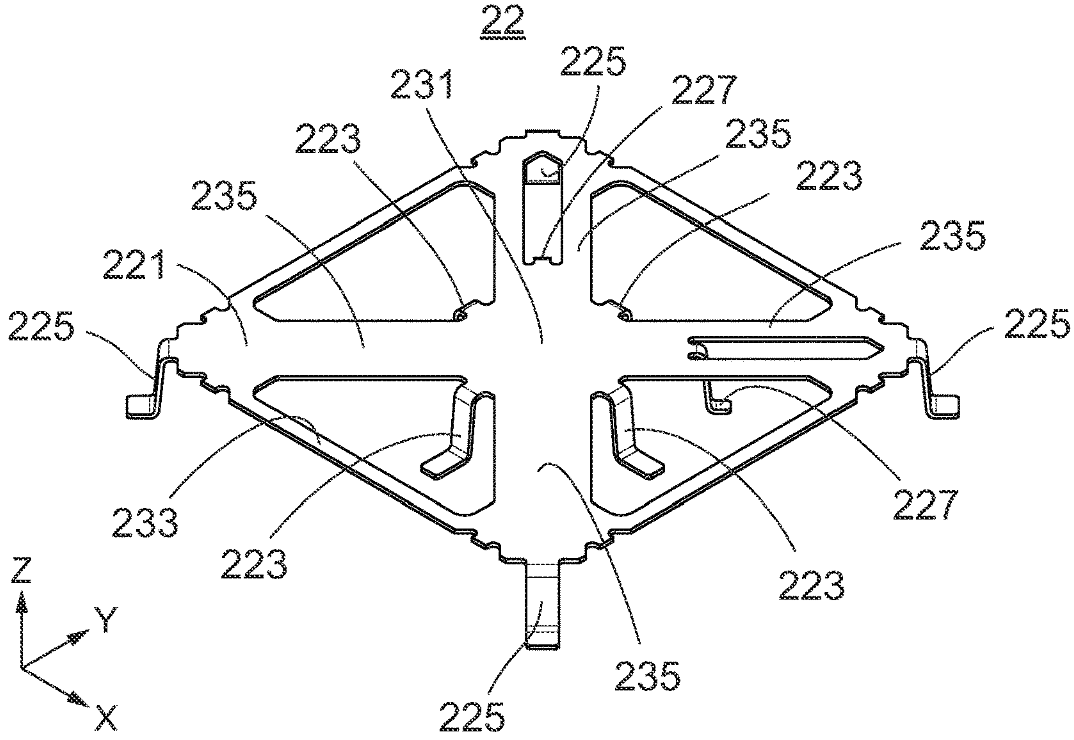
FIG. 4 is a perspective view showing an upper element included in an antenna element used in the antenna device of FIG. 1.
Figure 7:
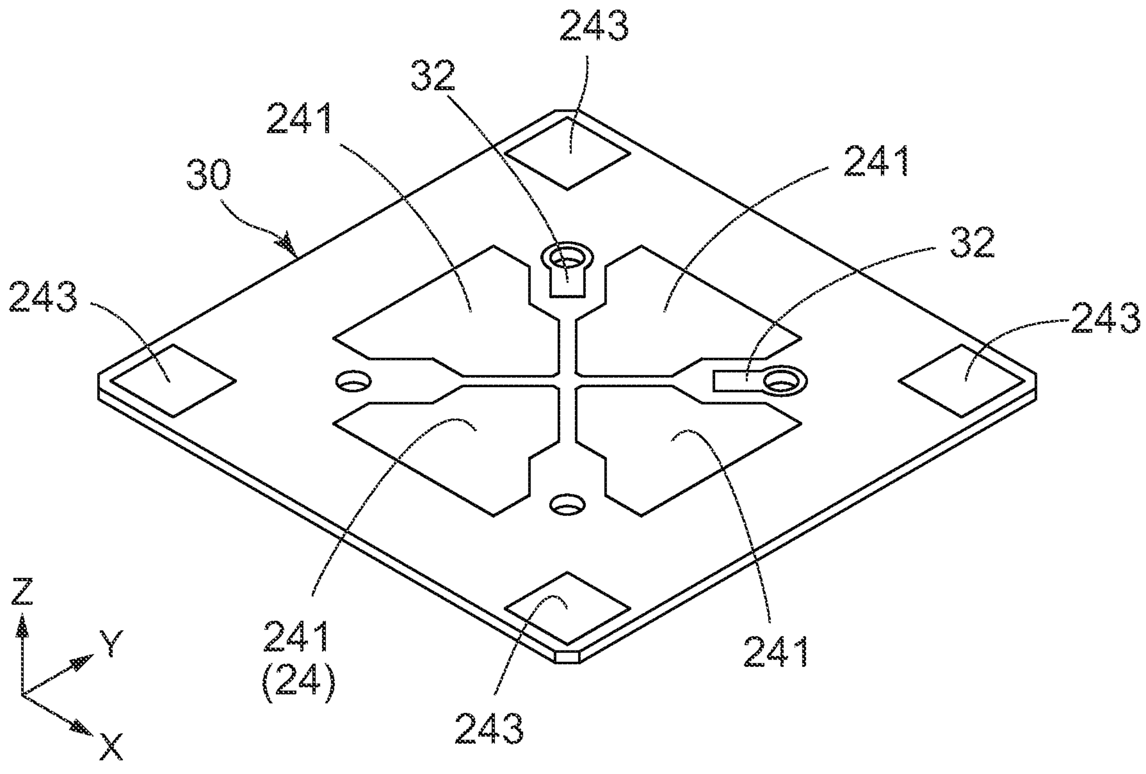
FIG. 7 is a perspective view showing a dielectric substrate used in the antenna device of FIG. 1. On an upper surface of the dielectric substrate, a lower element included in the antenna element used in the antenna device is provided.

As understood from FIGS. 4 and 7, the antenna element 20 has an upper element 22 and a lower element 24. In an up-down direction, the upper element 22 is located upward of the lower element 24. In the present embodiment, the up-down direction is a Z-direction. A positive Z-direction is directed upward while a negative Z-direction is directed downward.

Figure 5:
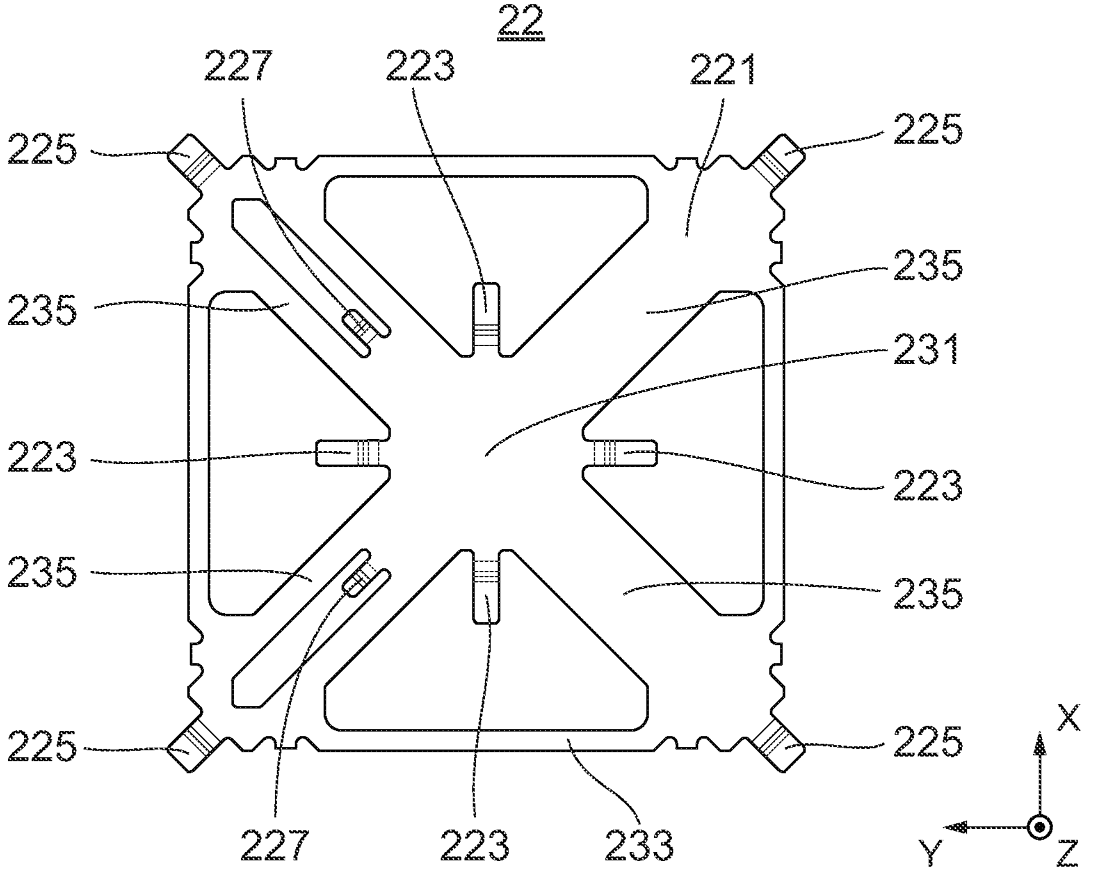
FIG. 5 is a top view showing the upper element of FIG. 4.
Figure 6:
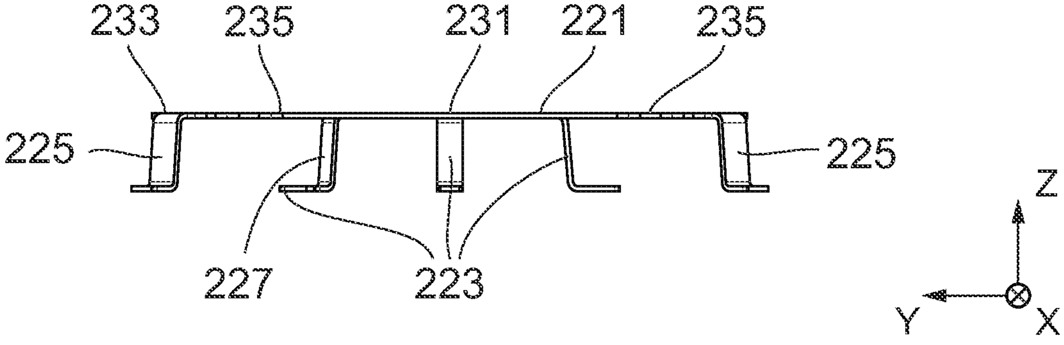
FIG. 6 is a rear view showing the upper element of FIG. 4.

As shown in FIGS. 4 to 6, the upper element 22 is provided with an upper conductor 221, at least one first leg portion 223, at least one second leg portion 225 and at least one feeding portion 227.

Figure 8:
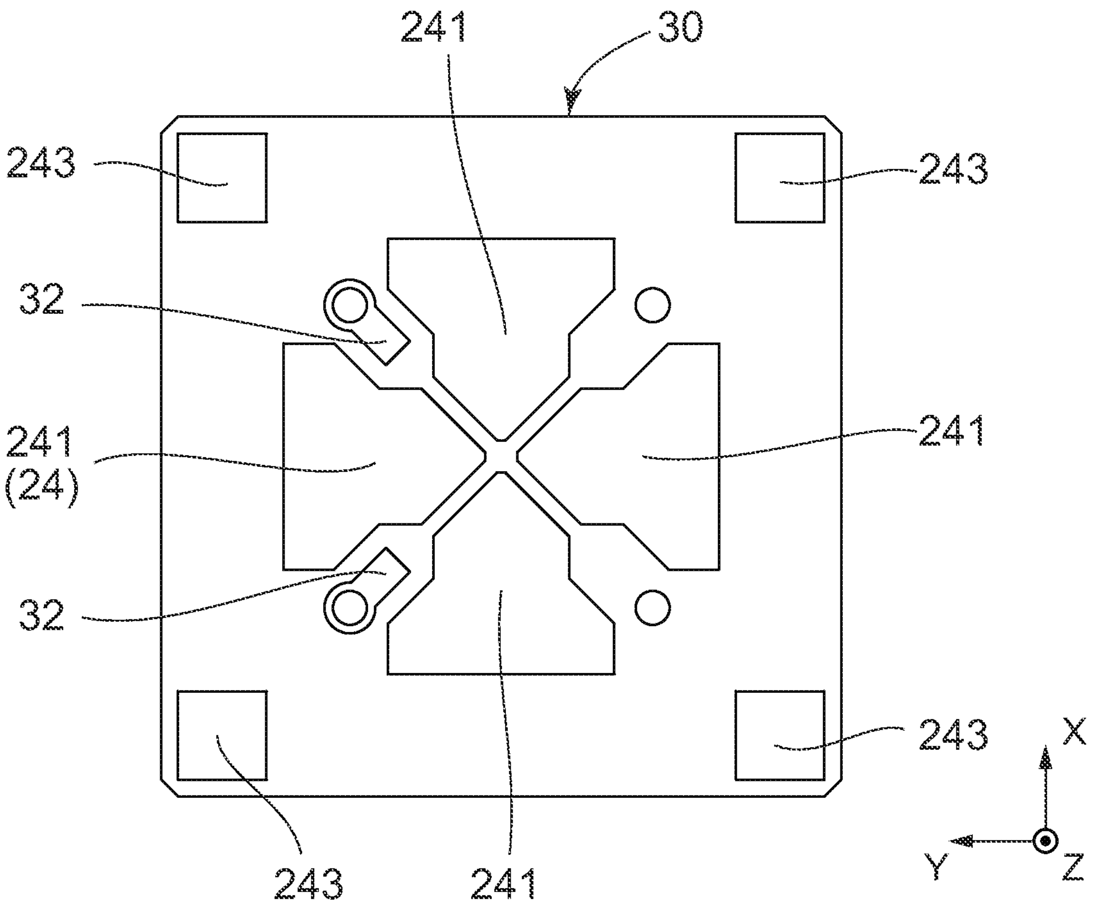
FIG. 8 is a top view showing the dielectric substrate of FIG. 7.

As shown in FIGS. 7 and 8, the lower element 24 is provided with at least one first lower conductor 241 and at least one second lower conductor 243.

As understood from FIGS. 4 to 6, in the present embodiment, the upper element 22 is formed of a single sheet metal. In other words, the upper conductor 221, the at least one first leg portion 223, the at least one second leg portion 225 and the at least one feeding portion 227 are formed of a single sheet metal. In detail, the upper element 22 is integrally formed by punching out a single sheet metal, followed by bending the punched-out sheet metal. However, the present invention is not limited thereto. The upper element 22 may be formed by use of a plurality of sheet metals. Alternatively, the upper element 22 may be formed by a laser direct structuring (LDS) method.

As shown in FIG. 5, in the present embodiment, each of the at least one first leg portion 223 and the at least one second leg portion 225 is four in number. In the present embodiment, the at least one feeding portion 227 is two in number. In other words, in the present embodiment, the at least one feeding portion 227 has two feeding portions 227. However, the present invention is not limited thereto. Each of the number of the first leg portions 223, the number of the second leg portions 225 and the number of the feeding portions 227 may be freely set.

As understood from FIG. 8, in the present embodiment, the lower element 24 is provided with the first lower conductors 241 and the second lower conductors 243. The first lower conductors 241 and the second lower conductors 243 are provided on an upper surface of the dielectric substrate 30. The first lower conductors 241 and the second lower conductors 243 may be formed by etching a conductor layer formed on the upper surface of the dielectric substrate 30. Alternatively, the first lower conductors 241 and the second lower conductors 243 may be formed by sticking conductor sheets or films each of which has a predetermined shape on the upper surface of the dielectric substrate 30. However, the present invention is not limited thereto. At least part of the lower element 24 may be integrally formed with the upper element 22 by using a material same as that of the upper element 22. The first lower conductors 241 and the second lower conductors 243 may not be located on the same plane perpendicular to the up-down direction. In other words, the first lower conductors 241 and the second lower conductors 243 may be located at different positions in the up-down direction. In that case, each of the first lower conductors 241 may overlap with any of the second lower conductors 243 in plan view. However, the first lower conductors 241 must be electrically separated from the second lower conductors 243.

As understood from FIGS. 2, 5 and 8, the first lower conductors 241 correspond to the first leg portions 223, respectively. In other words, the at least one first lower conductor 241 and the at least one first leg portion 223 are same as each other in number. In the present embodiment, the at least one first lower conductor 241 is four in number. In other words, the at least one first lower conductor 241 has four first lower conductors 241. The second lower conductors 243 correspond to the second leg portions 225, respectively. In other words, the at least one second lower conductor 243 and the at least one second leg portion 225 are same as each other in number. In the present embodiment, the at least one second lower conductor 243 is four in number. In other words, the at least one second lower conductor 243 has four second lower conductors 243. However, the present invention is not limited thereto. The number of the first lower conductors 241 may be freely set, provided that it is equal to the number of the first leg portions 223. The number of the second lower conductors 243 may be freely set, provided that it is equal to the number of the second leg portions 225.

As shown in FIGS. 7 and 8, on the upper surface of the dielectric substrate 30, at least one feeding pad 32 is further provided. The feeding pads 32 correspond to the feeding portions 227, respectively. In the present embodiment, the at least one feeding pad 32 is two in number. The feeding pads 32 are connected to feeding lines (not shown) provided on a lower surface of the dielectric substrate 30 through vias piercing through the dielectric substrate 30 in the up-down direction.

As shown in FIG. 3, the ground conductor 40 is located just under the dielectric substrate 30. In other words, the antenna device 10 is mounted on the ground conductor 40. As the ground conductor 40, a circuit board in which a conductor layer is formed on an entire surface of each of upper and lower surfaces of a dielectric substrate may be used. In that case, it is preferable that the conductor layer on the upper surface and the conductor layer on the lower surface are connected to each other by use of vias or the like.

Figure 9:
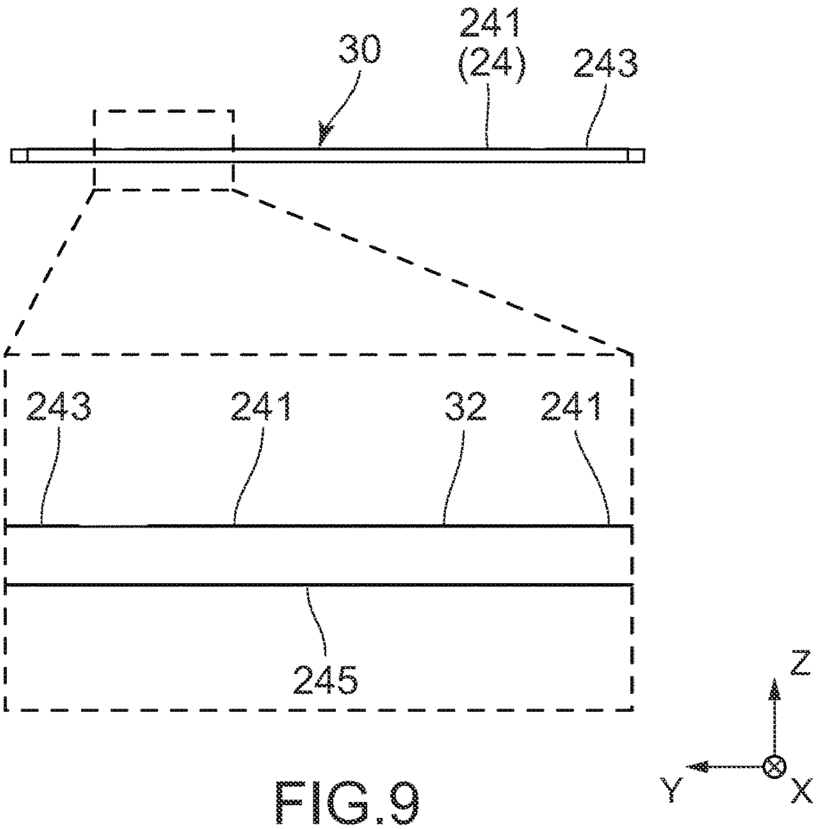
FIG. 9 is a rear view showing the dielectric substrate of FIG. 7.

As understood from FIGS. 3 and 9, in the present embodiment, a ground layer 245 is formed on the lower surface of the dielectric substrate 30 and covers almost the whole of the lower surface of the dielectric substrate 30. The ground conductor 40 arranged under the dielectric substrate 30 is electrically connected to the ground layer 245. However, the present invention is not limited thereto. The dielectric substrate 30 may not have the ground layer 245.

Referring to FIG. 5, in the present embodiment, an outer shape of the upper conductor 221 is generally square in plan view. However, the present invention is not limited thereto. The outer shape of the upper conductor 221 may not be generally square in plan view. Nevertheless, in order to use the antenna device 10 for communication using circular polarized waves, it is preferable that the outer shape of the upper conductor 221 has approximately n-fold symmetry in plan view. Here, n is a multiple of four (the same applies hereafter).

As shown in FIG. 5, the upper conductor 221 has a middle portion 231, a ring portion 233 and coupling portions 235. The middle portion 231 is part of the upper conductor 221 which includes a middle of the upper conductor 221 in plan view. The ring portion 233 is part of the upper conductor 221 which is along an outer edge of the upper conductor 221. The coupling portions 235 are parts of the upper conductor 221 each of which couples the middle portion 231 and the ring portion 233 to each other. It is noted that a boundary between the middle portion 231 and each of the coupling portions 235 and a boundary between the ring portion 233 and each of the coupling portions 235 are indefinite.

As shown in FIG. 5, in the present embodiment, an outer shape of the middle portion 231 is square approximately analogous to the outer shape of the upper conductor 221 in plan view. In the present embodiment, the ring portion 233 has a frame shape which is generally square that is along the outer shape of the upper conductor 221. The ring portion 233 is located apart from and outward of the middle portion 231 and continuously surrounds the middle portion 231 in plan view. In the present embodiment, the coupling portions 235 are four in number. The coupling portions 235 correspond to four corners of the middle portion 231, respectively, and to four corners of the ring portion 233, respectively. Each of the coupling portions 235 couples the corner of the middle portion 231 corresponding thereto to the corner of the ring portion 233 corresponding thereto.

As understood from FIGS. 5 and 6, in the present embodiment, the middle portion 231, the ring portion 233 and the coupling portions 235 are located on a plane intersecting with the up-down direction. In other words, the upper conductor 221 extends in the plane intersecting with the up-down direction. In the present embodiment, the upper conductor 221 extends in a plane perpendicular to the up-down direction. However, the present invention is not limited thereto. The ring portion 233 may not be, in part, located on the plane on which the middle portion 231 and the coupling portions 235 are located.

As shown in FIGS. 4 to 6, the first leg portions 223 extend from the middle portion 231. In the present embodiment, the first leg portions 223 extend outward in plan view. In detail, each of the first leg portions 223 extends outward from any one of four edges of the middle portion 231 in a horizontal direction, then extends downward and further extends outward in the horizontal direction. In the present embodiment, each of the first leg portions 223 extends in either a front-rear direction or a lateral direction. In the present embodiment, the front-rear direction is an X-direction, and the lateral direction is a Y-direction. A positive X-direction is directed forward while a negative X-direction is directed rearward.

As shown in FIGS. 4 to 6, the second leg portions 225 extend from the ring portion 233. In the present embodiment, the second leg portions 225 extend outward from an outer edge of the ring portion 233 in plan view. In detail, each of the second leg portions 225 extends outward from any one of four corners of the ring portion 233 in the horizontal direction, then extends diagonally downward and further extends outward in the horizontal direction. In the present embodiment, a direction in which each of the second leg portions 225 extends is an outward direction in a diagonal direction of the upper conductor 221. However, the present invention is not limited thereto. The second leg portions 225 may extend inward from inner edges of the ring portion 233 in plan view. In that case, the second leg portions 225 may extend inward or outward of the ring portion 233 in plan view.

As shown in FIGS. 4 to 6, the feeding portions 227 extend from the upper conductor 221. In the present embodiment, the feeding portions 227 respectively extend from two of the coupling portions 235 adjacent to each other in the front-rear direction. However, the present invention is not limited thereto. The feeding portions 227 may extend from the middle portion 231.

As understood from FIG. 5, two imaginary lines each of which connects the middle of the middle portion 231 to each of the feeding portions 227 intersect each other at 90 degrees in plan view. Accordingly, communication using circular polarized waves produced by a two-point feeding system can be realized by use of the antenna device 10.

As shown in FIGS. 7 and 8, the first lower conductors 241 are apart from each other and arranged on the middle portion 231 of the dielectric substrate 30. The first lower conductors 241 are arranged in four-fold symmetry about the middle of the dielectric substrate 30 in plan view. In the present embodiment, a shape of each of the first lower conductors 241 is an enneagon which has line symmetry about a straight line. However, the present invention is not limited thereto. The shape of each of the first lower conductors 241 may be freely set. Nevertheless, it is preferable that the first lower conductors 241 are formed in approximately n-fold symmetry about the middle of the dielectric substrate 30 in plan view.

As understood from FIGS. 1 to 3, each of the first lower conductors 241 is connected to the first leg portion 223 corresponding thereto. In other words, the first lower conductors 241 are connected to the first leg portions 223 in a one-to-one relationship. Owing to existence of the first leg portions 223, the first lower conductors 241 are apart from the upper conductor 221 in the up-down direction.

As shown in FIGS. 7 and 8, the second lower conductors 243 are arranged at corner portions of the dielectric substrate 30, respectively. Each of the second lower conductors 243 is distinct and separated from the first lower conductors 241 and apart from all of the first lower conductors 241. In the present embodiment, a shape of each of the second lower conductors 243 is square in plan view. However, the present invention is not limited thereto. The shape of each of the second lower conductors 243 may be freely set. Nevertheless, it is preferable that the second lower conductors 243 are formed in approximately n-fold symmetry about the middle of the dielectric substrate 30 in plan view.

As understood from FIGS. 1 to 3, each of the second lower conductors 243 is connected to the second leg portion 225 corresponding thereto. In other words, the second lower conductors 243 are connected to the second leg portions 225 in a one-to-one relationship. Owing to existence of the second leg portions 225, the second lower conductors 243 are apart from the upper conductor 221 in the up-down direction.

As shown in FIGS. 7 and 8, each of the feeding pads 32 is arranged on a diagonal line of the dielectric substrate 30. Each of the feeding pads 32 is located between two of the first lower conductors 241 adjacent to each other. The two feeding pads 32 are located on a straight line along the front-rear direction and sandwich one of the first lower conductors 241.

In the antenna device 10 shown in FIGS. 1 to 3, each of the first lower conductors 241 and the second lower conductors 243 forms a capacitor together with the upper conductor 221. Accordingly, existence of the first lower conductors 241 and the second lower conductors 243 affects resonant frequencies of the antenna device 10. In detail, the existence of the first lower conductors 241 and the second lower conductors 243 reduces the resonant frequencies in comparison with a case of their absence. In other words, the existence of the first lower conductors 241 and the second lower conductors 243 allows the antenna element 20 having predetermined resonance frequencies to be downsized and thereby allows the antenna device 10 to be downsized.

In the antenna device 10 shown in FIGS. 1 to 3, each of the first lower conductors 241 and the second lower conductors 243 also forms a capacitor together with the ground conductor 40. In place of this capacitor, a capacitor element, such as a chip capacitor, may be connected between the ground conductor 40 and each of the first lower conductors 241 and the second lower conductors 243.

The antenna device 10 shown in FIGS. 1 to 3 has a first resonance frequency and a second resonance frequency higher than the first resonance frequency. The shape of the second lower conductor 243 and a size of the second lower conductor 243 affect setting of both the first resonance frequency and the second resonance frequency. On the other hand, the shape of the first lower conductor 241 and a size of the first lower conductor 241 only affect setting of the first resonance frequency. Accordingly, decision of the shape and the size of each of the first lower conductors 241 and the second lower conductors 243 makes it possible to set each of the first resonance frequency and the second resonance frequency to a desired frequency. Thus, the antenna element 20 and the antenna device 10 each of which is capable of dual-band communication can be obtained.

The antenna device 10 shown in FIGS. 1 to 3 adopts the two-point feeding system. In detail, by inputting a first input signal into one of the feeding pads 32 and inputting a second input signal which has a phase different from that of the first input signal at 90 degrees to the other of the feeding pads 32, the antenna element 20 can perform communication using circular polarized waves each of which has a high degree of roundness. In order to realize the communication using the circular polarized waves each of which has a high degree of roundness, the outer shape of the upper conductor 221, an arrangement of the first lower conductors 241 and an arrangement of the second lower conductors 243 are preferable to have approximately n-fold symmetry.

Second Embodiment

Figure 10:
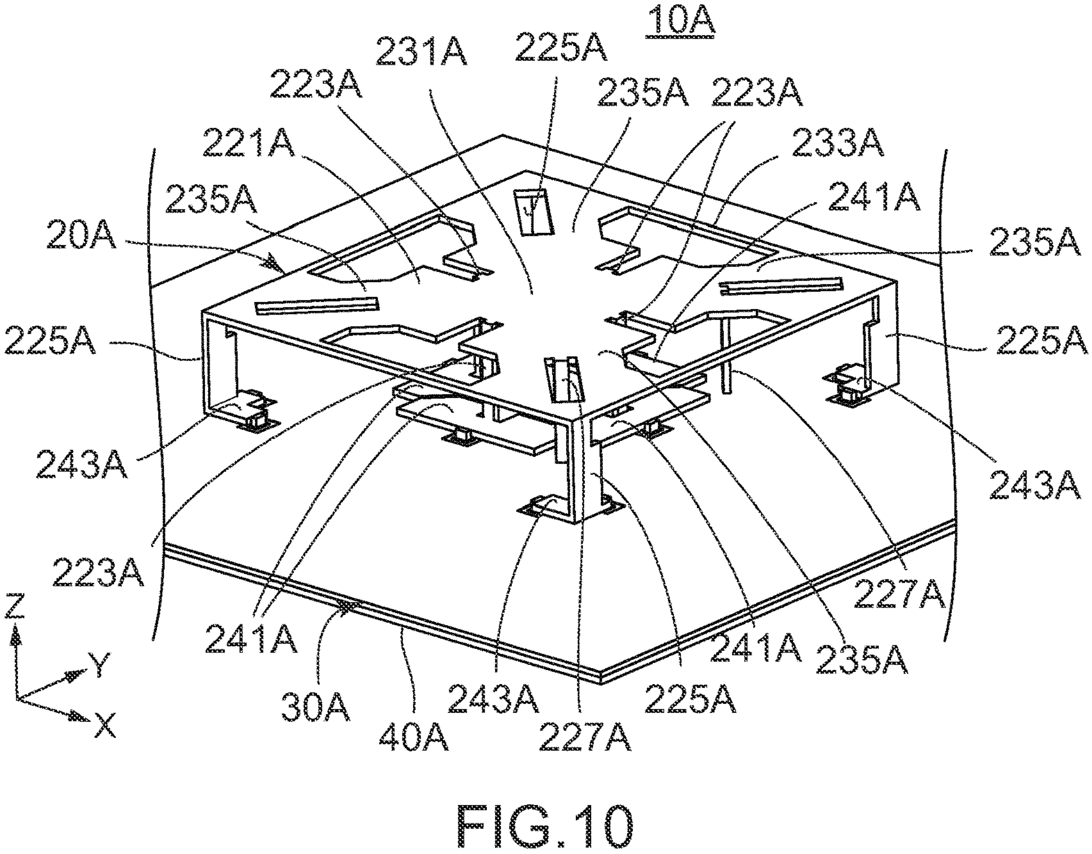
FIG. 10 is a perspective view showing an antenna device according to a second embodiment of the present invention.
Figure 11:
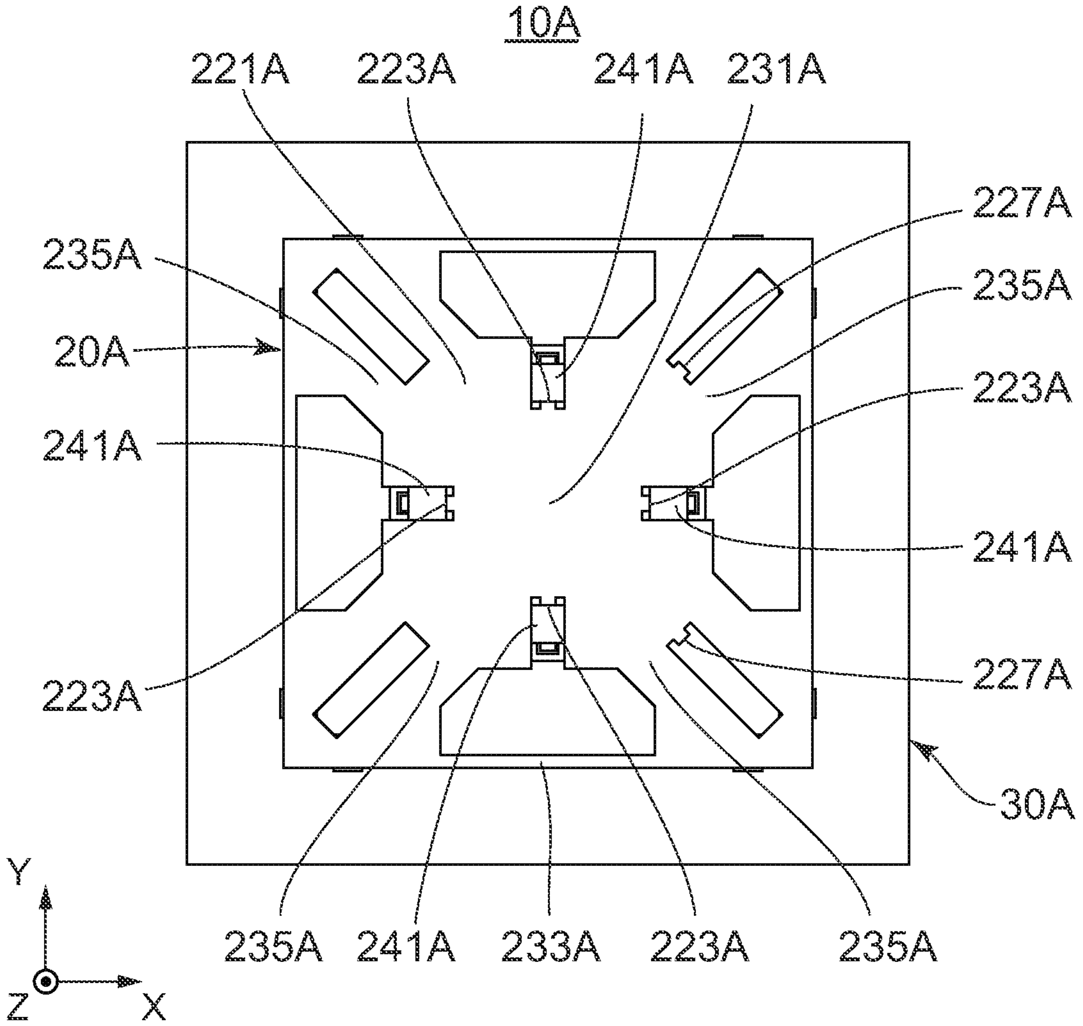
FIG. 11 is a top view showing the antenna device of FIG. 10.
Figure 12:
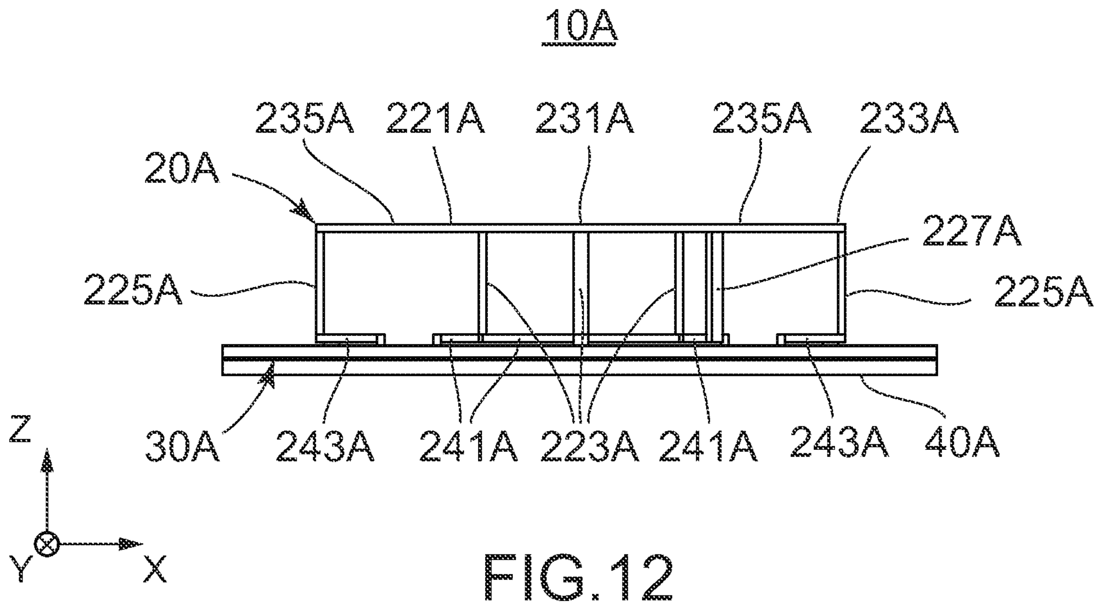
FIG. 12 is a side view showing the antenna device of FIG. 10.

Referring to FIGS. 10 to 12, an antenna device 10A according to a second embodiment of the present invention is provided with an antenna element 20A, a dielectric substrate 30A and a ground conductor 40A. The antenna device 10A is basically formed in a manner similar to the antenna device 10 according to the first embodiment of the present invention.

As understood from FIGS. 10 to 12, the antenna element 20A is provided with an upper conductor 221A, at least one first leg portion 223A, at least one second leg portion 225A, at least one feeding portion 227A, at least one first lower conductor 241A and at least one second lower conductor 243A. In the present embodiment, the antenna element 20A is formed of a single sheet metal. The upper conductor 221A has a middle portion 231A, a ring portion 233A and coupling portions 235A as with the upper conductor 221 of the first embodiment.

As understood from FIGS. 10 to 12, in the present embodiment, each of the at least one first leg portion 223A, the at least one second leg portion 225A, the at least one first lower conductor 241A and the at least one second lower conductor 243A is four in number. In the present embodiment, the at least one feeding portion 227A is two in number.

As understood from FIGS. 10 to 12, the antenna element 20A is mounted on an upper surface of the dielectric substrate 30A. On a lower surface of the dielectric substrate 30A, a ground conductor 40A is provided. With this structure, the antenna device 10A operates in a manner similar to the antenna device 10 according to the first embodiment.

According to the present embodiment, the antenna element 20A can be downsized, and the antenna device 10A can be downsized. Moreover, according to the present embodiment, the antenna element 20A and the antenna device 10A each of which is capable of dual-band communication can be obtained. Because the first lower conductors 241A and the second lower conductors 243A are united to the antenna element 20A, deterioration of positional accuracy of the first lower conductors 241A and the second lower conductors 243A, which depends on attaching accuracy, with respect to the upper conductor 221 can be prevented.

Although the specific explanation about the present invention is made above with reference to concrete embodiments, the present invention is not limited thereto but susceptible of various modifications and alternative forms without departing from the spirit of the invention.

[First Modification]

Figure 13:
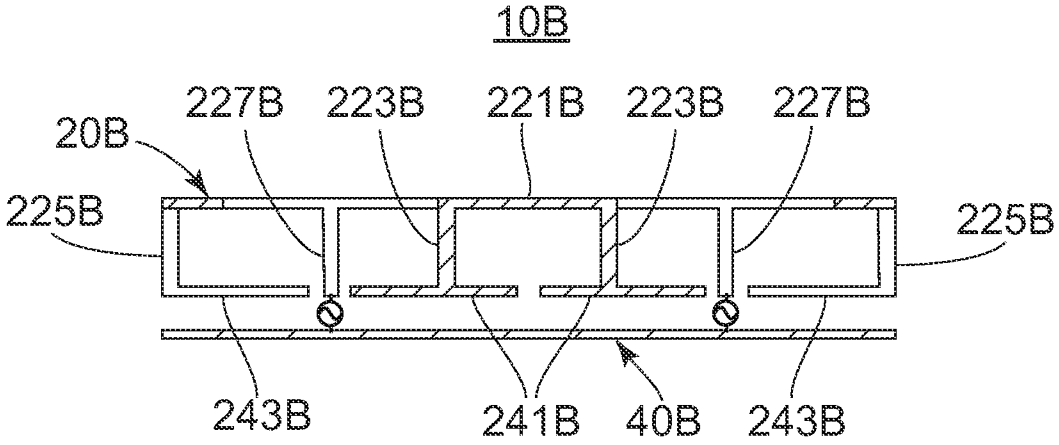
FIG. 13 is a schematic view showing a first modification of an antenna device according to the present invention.

Referring to FIG. 13, an antenna element 20B is provided with an upper conductor 221B, at least one first lower conductor 241B, at least one second lower conductor 243B, at least one first leg portion 223B, at least one second leg portion 225B and at least one feeding portion 227B.

As shown in FIG. 13, the antenna element 20B is arranged apart from and upward of a ground conductor 40B and forms an antenna device 10B. The antenna element 20B and the ground conductor 40B are fixed to each other with supporting members (not shown). Between the antenna element 20B and the ground conductor 40B, air exists as a dielectric body. Thus, in the antenna device of the present invention, the dielectric body may be air.

[Second Modification]

Figure 14:
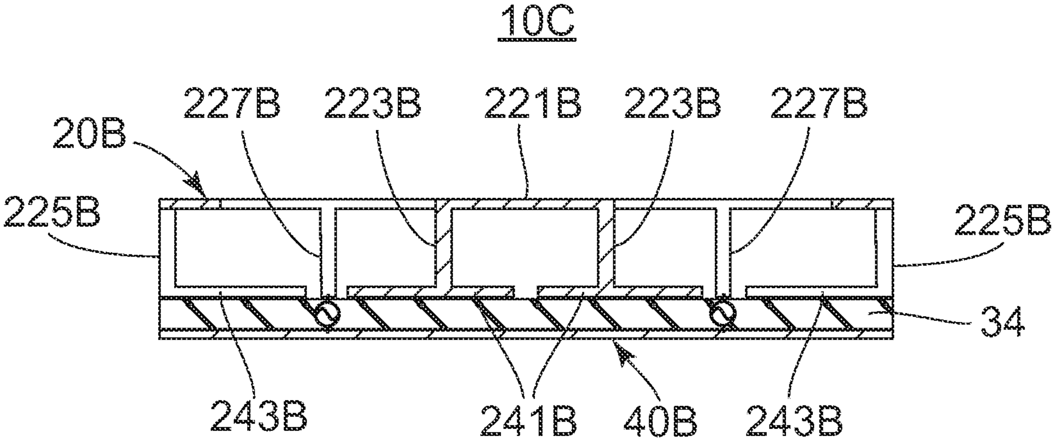
FIG. 14 is a schematic view showing a second modification of the antenna device according to the present invention.

Referring to FIG. 14, an antenna device 10C is formed by arranging an antenna element 20B to be apart from and upward of a ground conductor 40B. In the up-down direction, a space between the ground conductor 40B and each of first lower conductors 241B and second lower conductors 243B is filled with a dielectric body 34. As the dielectric body 34, any resin, such as epoxy resin, Teflon (Registered Trademark), etc., may be used. Thus, in the antenna device of the present invention, the dielectric body may not be a rigid substrate.

[Third Modification]

Figure 15:
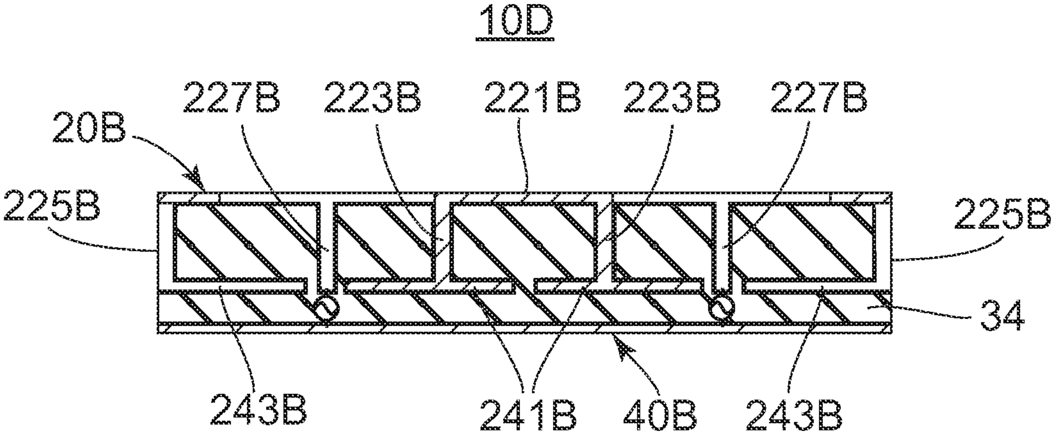
FIG. 15 is a schematic view showing a third modification of the antenna device according to the present invention.

Referring to FIG. 15, an antenna device 10D is formed by arranging an antenna element 20B to be apart from and upward of a ground conductor 40B. In the up-down direction, a space between an upper conductor 221B of the antenna element 20B and the ground conductor 40B is filled with a dielectric body 34. As the dielectric body 34, any resin, such as epoxy resin, Teflon (Registered Trademark), etc., may be used. Thus, in the antenna device of the present invention, not only a space between the antenna element 20B and the ground conductor 40B but also a space inside the antenna element 20B may be filled with a dielectric body.

[Fourth Modification]

Figure 16:
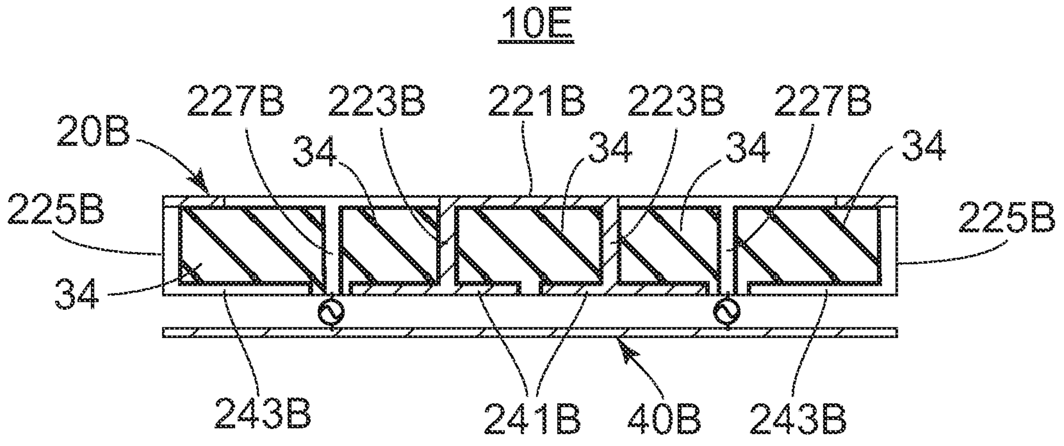
FIG. 16 is a schematic view showing a fourth modification of the antenna device according to the present invention.

Referring to FIG. 16, an antenna device 10E is formed by arranging an antenna element 20B to be apart from and upward of a ground conductor 40B. In the up-down direction, a space between an upper conductor 221B of the antenna element 20B and each of first lower conductors 241B and second lower conductors 243B is filled with a dielectric body 34. In the up-down direction, between the ground conductor 40B and each of first lower conductors 241B and second lower conductors 243B, air exists as a dielectric body. Thus, in the antenna device of the present invention, only the space inside the antenna element 20B may be filled with a tangible dielectric body.

[Modification of Slots]

In a case where the upper element 22 or the antenna element 20A is formed of a single sheet metal, cutting and rising the first leg portions 223 or 223A and the feeding portions 227 or 228A are carried out. At that time, in the upper conductor 221 or 221A, slots or aperture portions are inevitably formed. A shape of each of the slots may be freely set as shown in any of FIGS. 17 to 24, for example. Nevertheless, it is preferable that the shape of the upper conductor, shapes of the slots and arrangement of the slots have n-fold symmetry in order to realize the communication using circular polarized waves.

Figure 17:
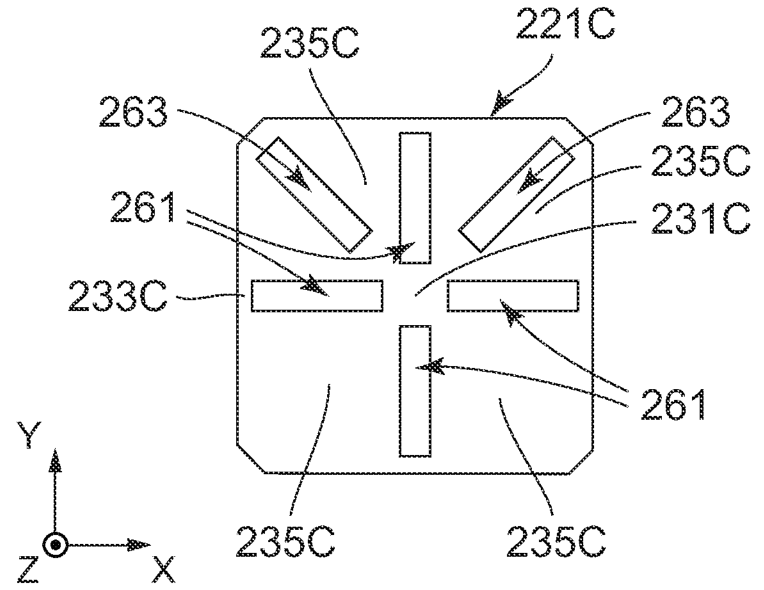
FIG. 17 is a schematic view showing a first modification of slots formed in an antenna element according to the present invention.

Referring to FIG. 17, in an upper conductor 221C, four first slots 261 and two second slots 263 are formed. A shape of each of the first slots 261 and the second slots 263 is rectangular. The first slots 261 correspond to the first leg portions 223 of the first embodiment, respectively, for example. The second slots 263 correspond to the feeding portions 227 of the first embodiment, respectively, for example.

Figure 18:
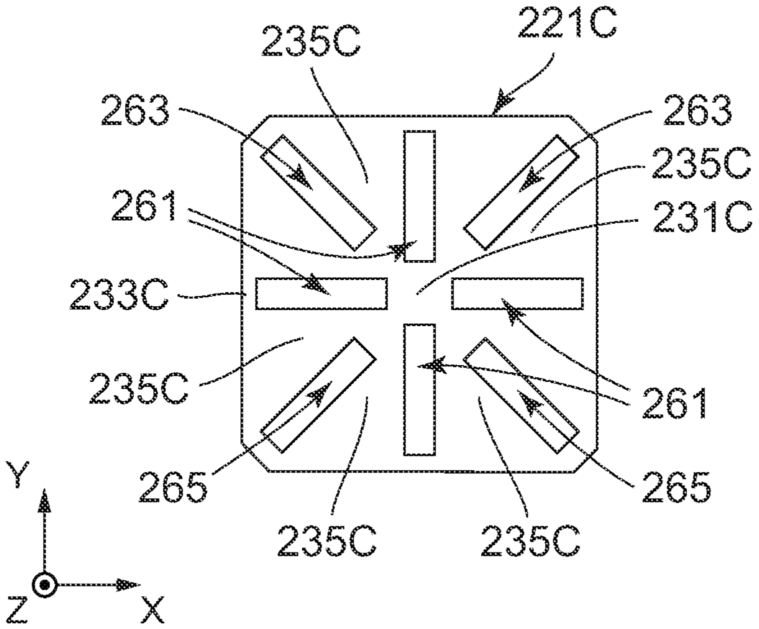
FIG. 18 is a schematic view showing a second modification of the slots formed in the antenna element according to the present invention.

Referring to FIG. 18, two third slots 265 are further formed in comparison with the upper conductor 221C of FIG. 17. The third slots 265 are dummy slots which correspond to neither the first leg portions 223 nor the feeding portions 227. By forming the dummy slots, the shape of the upper conductor 221 of FIG. 18 has four-fold symmetry. With this structure, circular polarized waves each of which has a higher degree of roundness are obtained.

Figure 19:
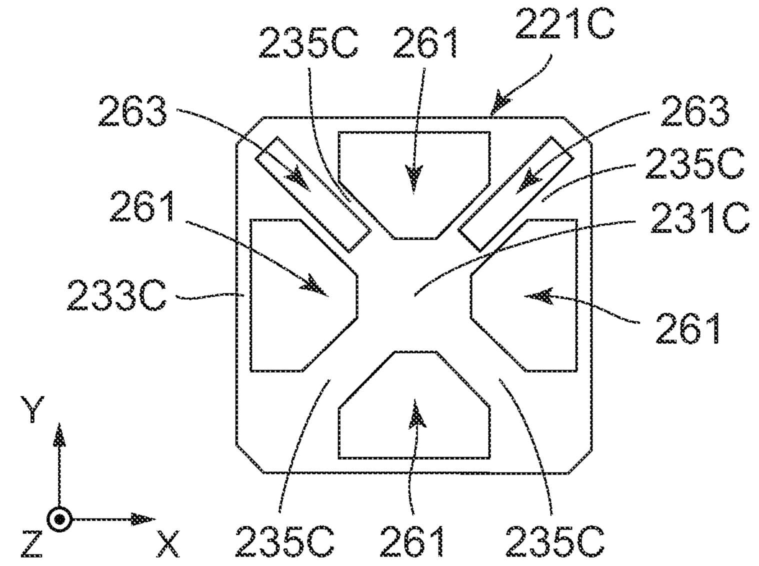
FIG. 19 is a schematic view showing a third modification of the slots formed in the antenna element according to the present invention.
Figure 20:
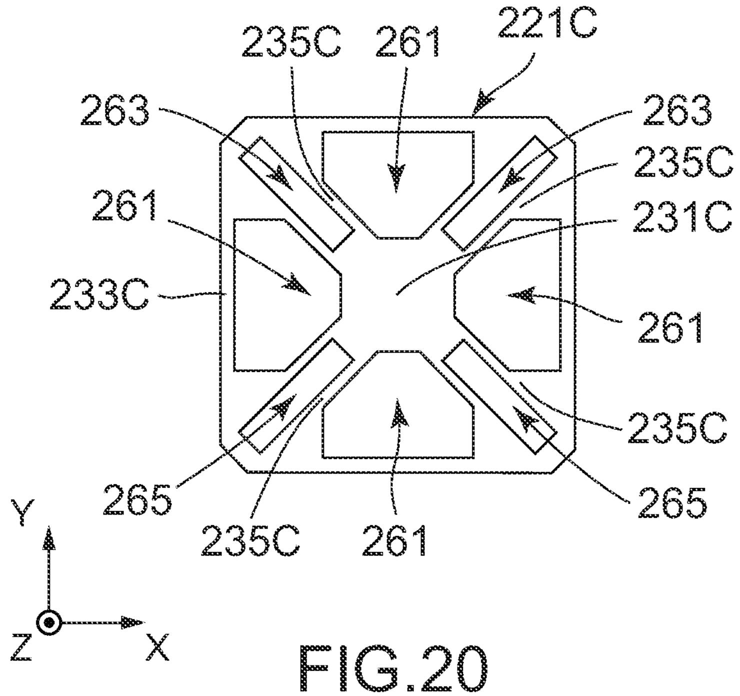
FIG. 20 is a schematic view showing a fourth modification of the slots formed in the antenna element according to the present invention.
Figure 21:
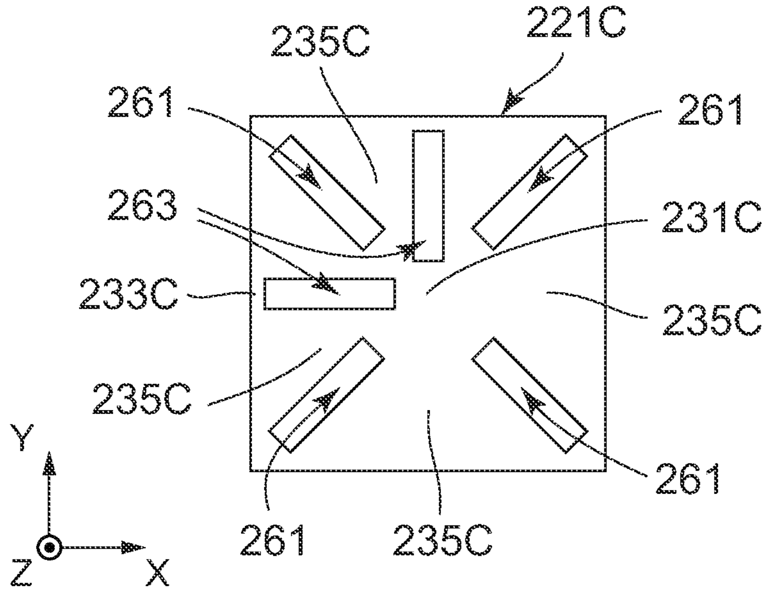
FIG. 21 is a schematic view showing a fifth modification of the slots formed in the antenna element according to the present invention.
Figure 22:
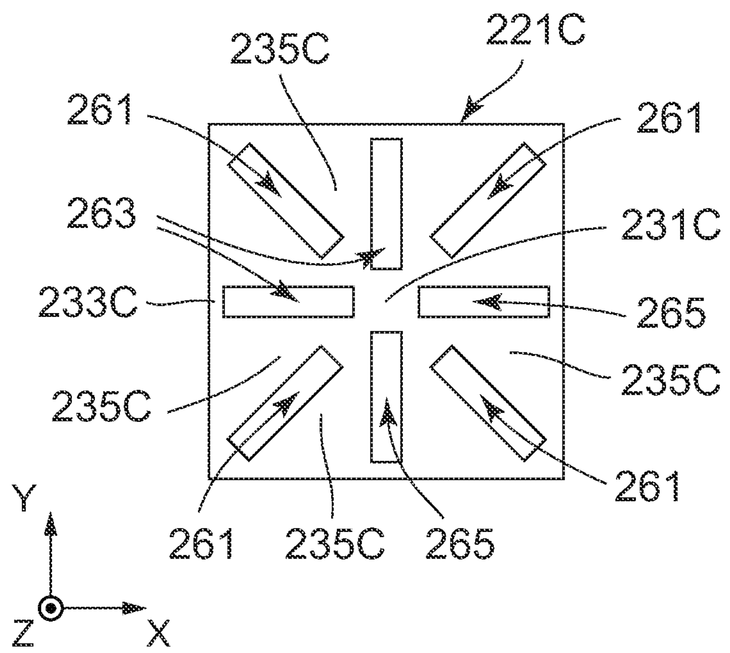
FIG. 22 is a schematic view showing a sixth modification of the slots formed in the antenna element according to the present invention.

As shown in FIG. 19 or 20, a shape of each of the first slots 261 may be hexagonal.

Figure 23:
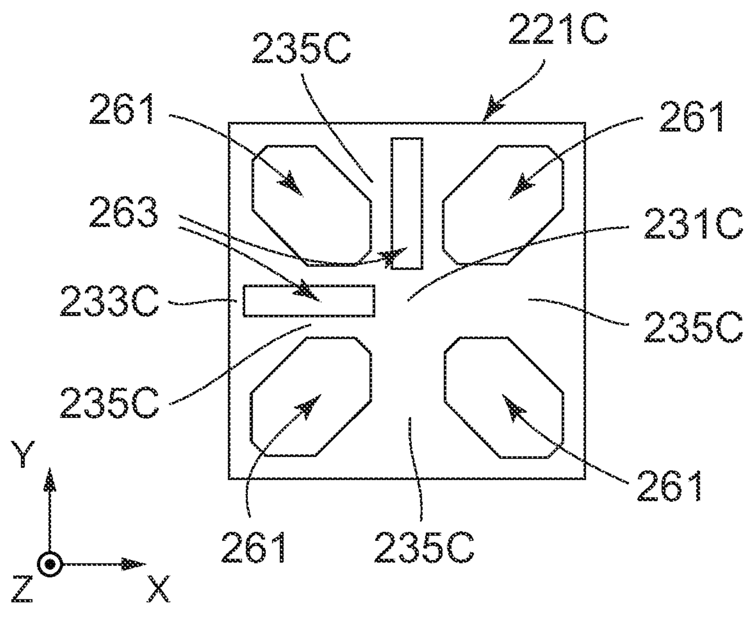
FIG. 23 is a schematic view showing a seventh modification of the slots formed in the antenna element according to the present invention.
Figure 24:
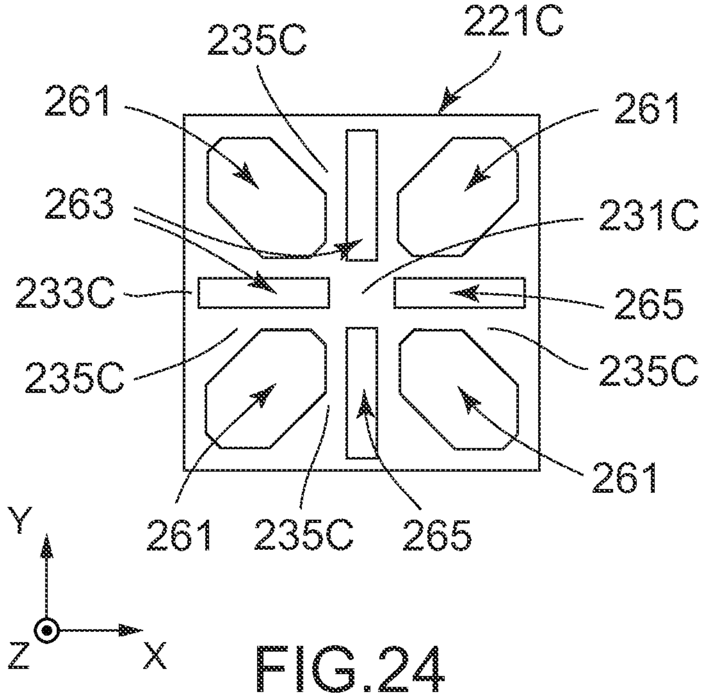
FIG. 24 is a schematic view showing an eighth modification of the slots formed in the antenna element according to the present invention.
Figure 25:
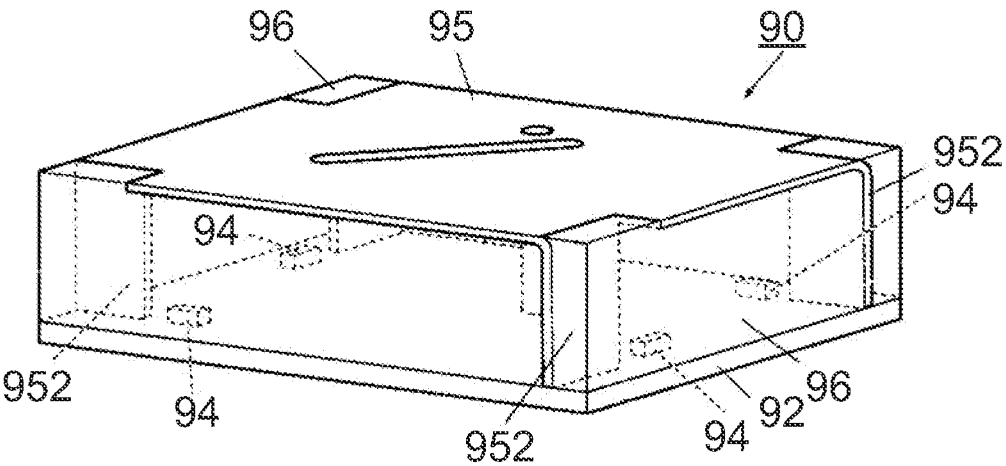
FIG. 25 PRIOR ART
FIG. 25 is a perspective view showing an antenna device disclosed in Patent Document 1.

In the upper conductor 221C of each of FIGS. 17 to 20, each of the first slots 261 is arranged between a middle of the upper conductor 221C and any one of edges of the upper conductor 221C, and each of the second slots 263 is arranged between the middle of the upper conductor 221C and any one of corners of the upper conductor 221C. However, as shown in FIGS. 21 to 24, each of the first slots 261 may be arranged between the middle of the upper conductor 221C and any one of the corners of the upper conductor 221C, and each of the second slots 263 may be arranged between the middle of the upper conductor 221C and any one of the edges of the upper conductor 221C. As shown in FIG. 23 or 24, a shape of each of the first slots 261 may be octagonal.

In the upper conductor 221C shown in each of FIGS. 17 to 24, none of the first slots 261, the second slots 263 and the third slots 265 reach the middle of the upper conductor 221C and an outer edge of the upper conductor 221C. Accordingly, the upper conductor 221C shown in each of FIGS. 17 to 24 has a middle portion 231C, a ring portion 233*c* continuously surrounding the middle portion 231C and coupling portions 235C each of which couples the middle portion 231C and the ring portion 233C to each other.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An antenna element for forming an antenna device by being mounted on a ground conductor via a dielectric body, wherein:

the antenna element comprises an upper conductor, at least one first lower conductor, at least one second lower conductor, at least one first leg portion, at least one second leg portion and at least one feeding portion;

the upper conductor has a middle portion, a ring portion and a coupling portion;

the ring portion is located apart from the middle portion and continuously surrounds the middle portion;

the coupling portion couples the middle portion and the ring portion to each other;

the at least one first leg portion extends from the middle portion;

the at least one second leg portion extends from the ring portion;

the at least one first lower conductor is apart from the upper conductor in an up-down direction and connected to the at least one first leg portion;

the at least one second lower conductor is distinct and separated from the at least one first lower conductor and is apart from the at least one first lower conductor;

the at least one second lower conductor is apart from the upper conductor in the up-down direction and connected to the at least one second leg portion; and the at least one feeding portion extends from the upper conductor.

2. The antenna element as recited in claim 1, wherein:

the at least one feeding portion comprises two feeding portions; and two imaginary lines each of which connects a middle of the middle portion and each of the two feeding portions to each other intersect each other at 90 degrees in plan view.

3. The antenna element as recited in claim 1, wherein:

the at least one first lower conductor and the at least one first leg portion are same as each other in number and connected to each other in a one-to-one relationship; and the at least one second lower conductor and the at least one second leg portion are same as each other in number and connected to each other in a one-to-one relationship.

4. The antenna element as recited in claim 3, wherein:

the at least one first lower conductor comprises four first lower conductors; and the at least one second lower conductor comprises four second lower conductors.

5. The antenna element as recited in claim 1, wherein:

the upper conductor extends in a plane intersecting with the up-down direction; and the upper conductor, the at least one first leg portion, the at least one second leg portion and the at least one feeding portion are formed of a single sheet metal.

6. The antenna element as recited in claim 1, wherein:

the upper conductor extends in a plane intersecting with the up-down direction; and the upper conductor, the at least one first lower conductor, the at least one second lower conductor, the at least one first leg portion, the at least one second leg portion and the at least one feeding portion are formed of a single sheet metal.

7. An antenna device comprising:

an antenna element as recited in claim 1;

a ground conductor; and a dielectric body lying between the antenna element and the ground conductor.

* * * * *